UNITED STATES PATENT OFFICE.

HEINRICH SCHNEIDER, OF ALTONA-OTTENSEN, GERMANY.

PROCESS OF TREATING CITRON-PEEL.

No. 848,210. Specification of Letters Patent. Patented March 26, 1907.

Application filed January 19, 1906. Serial No. 296,787.

*To all whom it may concern:*

Be it known that I, HEINRICH SCHNEIDER, a citizen of the German Empire, and a resident of Altona-Ottensen, Germany, have invented certain new and useful Improvements in Processes for the Manufacture of Candied Citron-Peel or the Like, of which the following is a specification.

The best candied citron-peel is ordinarily manufactured from thick pulpy skins or rind taken off a certain kind of citron grown in the south of Europe and which after being cut in quarters are at once soaked in solution of sugar-candy. However, in some instances they are cut and preserved in brine for exportation, and they are then treated with sugar solution at the place of consumption. In consequence of the difference in treatment the former sort have an almost dry and pleasant appearance and a white coating of sugar-candy, while the latter sort appear less clean and rather sticky. This objectionable feature of the last-named sort of candied peel is due to the fact that the salt impregnation is not thoroughly dissolved out before the application of the sweetening process. The residual salt constantly absorbs moisture from the air, and so keeps the sugar at the surface in a partially-dissolved condition, thus rendering the latter sticky and unsightly. Further, the residual salt renders the impregnation of the peel with the sweet solution difficult by reason of the reduced absorbing power of the salt-laden pores thereof, and thus an unreasonable amount of time is required for the treatment with the sugar solution.

These objections are overcome according to my improved process by carefully dissolving out all the salt before beginning the sweetening process. For this purpose it is necessary to cut the quarters of the preserved or salt peel into pieces of a size about that of Indian corn. These pieces are then soaked and washed in water, dried, and finally candied. In this manner it is possible to greatly increase the absorbing power of the peel, and the entire sweetening process can be carried out in about five to seven days, while under the ordinary process from six to seven months are required for the operation. Moreover, the quality as well as the general appearance of the article produced by my process are notably improved, and these small cubes of peel are in no way inferior to peel treated in its fresh natural condition, they being almost dry and well coated with white sugar-candy. The improved condition of the candied peel is of great importance, inasmuch as the operation of cutting ordinary candied peel of a sticky nature is unpleasant and tedious, while the reduced peel of this kind has the tendency of forming lumps that are difficult to separate and to mix evenly with other materials. The improved process enables an article to be obtained which is free from all the aforementioned objections and can be readily utilized under normal conditions.

What I claim is—

Process for treating citron-peel, which consists in impregnating the peel with brine, subdividing the impregnated peel into small pieces, washing and drying the pieces, and then candying them, substantially as specified.

Signed by me at Hamburg this 5th day of January, 1906.

HEINRICH SCHNEIDER.

Witnesses:
 AUGUST WENK,
 OTTO W. HELLMRICH.